United States Patent [19]
Abolins et al.

[11] 3,942,053
[45] Mar. 2, 1976

[54] DEVICE FOR SECURING A SUPERCONDUCTIVE EXCITER WINDING IN THE ROTOR OF A TURBOGENERATOR

[75] Inventors: Arnold Abolins, Mulheim; Ernst Massar, Erlangen; Erich Weghaupt, Mulheim, all of Germany

[73] Assignee: Kraftwerk Union Aktiengesellschaft, Mulheim (Ruhr), Germany

[22] Filed: July 23, 1974

[21] Appl. No.: 491,105

[30] Foreign Application Priority Data
Aug. 6, 1973  Germany............................ 2339772

[52] U.S. Cl. .................................... 310/52; 310/10
[51] Int. Cl.² ......................................... H02K 9/10
[58] Field of Search ............ 310/52, 40, 10, 60, 61, 310/59, 58

[56] References Cited
UNITED STATES PATENTS

| | | | |
|---|---|---|---|
| 3,517,231 | 6/1970 | Massar | 310/52 |
| 3,679,920 | 7/1972 | MacNab et al. | 310/10 |
| 3,742,265 | 6/1973 | Smith, Jr. | 310/52 |
| 3,745,389 | 7/1973 | Lorch | 310/52 |

*Primary Examiner*—Donovan F. Duggan
*Attorney, Agent, or Firm*—Herbert L. Lerner

[57] ABSTRACT

Device for securing a superconductive exciter winding in a thermally insulating, thermally elastic and short-circuit proof manner within the rotor of a turbogenerator wherein the rotor has a body part thereof formed as a hollow cylinder, including a plurality of telescoping intermediate cylinders disposable within the hollow cylinder spaced from and coaxial to one another and to the hollow cylinder, the intermediate cylinders forming cold shields and damping means, the hollow cylinder being closed at both ends thereof, a support cylinder located within and spaced from the innermost of the telescoping intermediate cylinders and adapted to support a superconductive exciter winding on the inner side thereof, means for connecting the cylindrical rotor body part through the intermediate cylinders to the support cylinder force-lockingly yet resiliently in radial direction and free to expand in axial direction, the spaces between the cylinders being evacuated so as to insulate the cylinders thermally one from the other, and a plurality of cooling circuit means for maintaining the cylinders individually at varying temperature levels.

13 Claims, 10 Drawing Figures

DEVICE FOR SECURING A SUPERCONDUCTIVE EXCITER WINDING IN THE ROTOR OF A TURBOGENERATOR

The invention relates to a device for securing a superconductive exciter winding in a thermally insulating, thermally elastic and short-circuit proof manner within the rotor of a turbogenerator and, more particularly, the rotor has an active body part thereof that is formed as a hollow cylinder and contains in the interior thereof vibration damping means, such as a damping cylinder and a support cylinder adapted to support a superconductive exciter winding on the inner side thereof.

A turbogenerator of the foregoing general type with a superconductive exciter winding or coil is described, for example, in U.S. Pat. No. 3,679,920 issued July 25, 1972, the exciter winding of which is disposed on the inner side of a hollow shaft constructed as a support cylinder, which absorbs the centrifugal forces of the winding. In this heretofore known construction, the damper winding is constructed as a cylinder which coaxially surrounds and is radially spaced from the support cylinder, and is connected at both ends thereof by wedges or keys to the hollow shaft of the rotor. With this heretofore known construction, it is very difficult, however, to control reliably the high forces and moments occurring at the damping cylinder during an impulse short circuit. Moreover, the vacuum-tightness at the connecting points between the damping means and the rotor cylinder is very unreliable because of the large relative thermal expansions occurring between the damping means and the rotor body; accordingly, difficulties arise with respect to effecting adequate thermal insulation of the superconductive exciter winding and the short-circuit proof mounting thereof.

For the suspension of such a superconductive exciter winding, the following conditions must be especially met:

Heat introduction from the outside into the superconductive exciter winding that is low-cooled or cryogenically cooled with liquid helium must be prevented; the axial and radial differential displacements produced by temperature and centrifugal force effects between the outer rotor body and the inner winding carrier must be elastically bridged over or adjusted; the superconductive exciter winding must be highly effectively magnetically shielded against high frequency alternating fields during asymmetric loading of the generator and during short circuiting and, finally, a high mechanical resistance to short circuiting of the winding suspension must be assured while yet having adequate elasticity.

It is accordingly an object of the invetion to provide a device for securing a superconductive exciter winding within the rotor of a turbogenerator which fulfills all of the foregoing requirements and which nevertheless is of relatively simple construction.

With the foregoing and other objects in view, there is provided, in accordance with the invention, a device for securing a superconductive exciter winding in a thermally insulating, thermally elastic and short-circuit proof manner within the rotor of a turbogenerator wherein the rotor has a body part thereof formed as a hollow cylinder, comprising a plurality of telescoping intermediate cylinders disposable within the hollow cylinder spaced from and coaxial to one another and to the hollow cylinder, the intermediate cylinders forming cold shields and damping means, the hollow cylinder being closed at both ends thereof, a support cylinder located within and spaced from the innermost of the telescoping intermediate cylinders and adapted to support a superconductive exciter winding on the inner side thereof, means for connecting the cylindrical rotor body part through the intermediate cylinders to the support cylinder force-lockingly yet resiliently in radial direction and free to expand in axial direction, the spaces between cylinders being evacuated so as to insulate the cylinders thermally one from the other, and a plurality of cooling circuit means for maintaining the cylinders individually at varying temperature levels.

In accordance with another feature of the invention, the cylindrical rotor body part, the intermediate cylinders and the winding support cylinder are connected one to another with minimal contact areas through pairwise axially transposed articulating points, so that direct thermal bridges are thereby reliably avoided.

Further advantageous features of the invention are included in the claims appended hereto and form a part of the disclosure in this application.

Although the invention is illustrated and described herein as embodied in device for securing a superconductive exciter winding in the rotor of a turbogenerator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 4A:
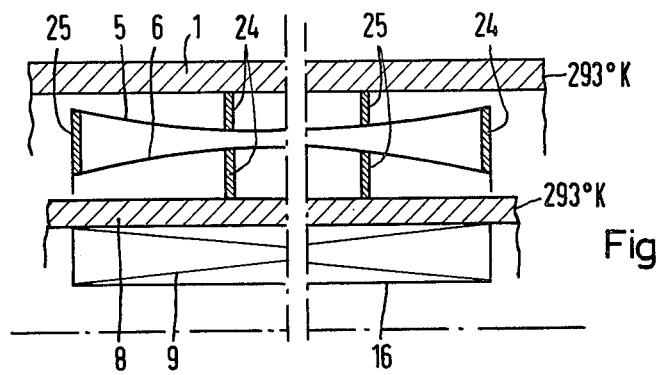
Figure 4B:
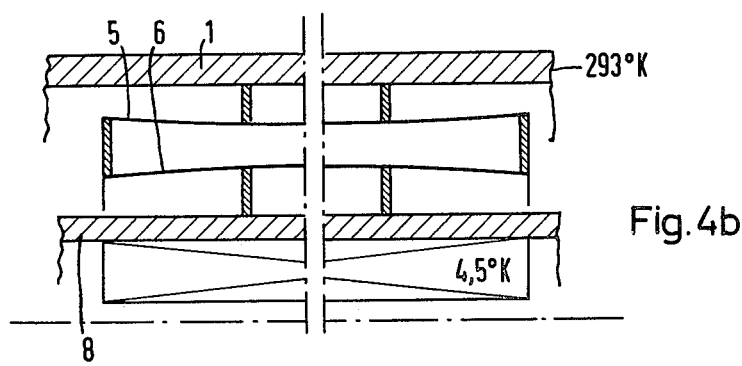
Figure 5A:
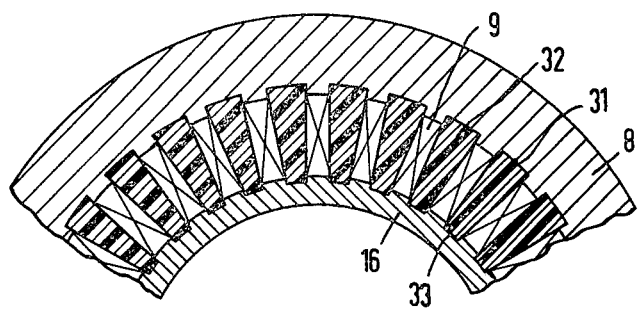
Figure 5B:
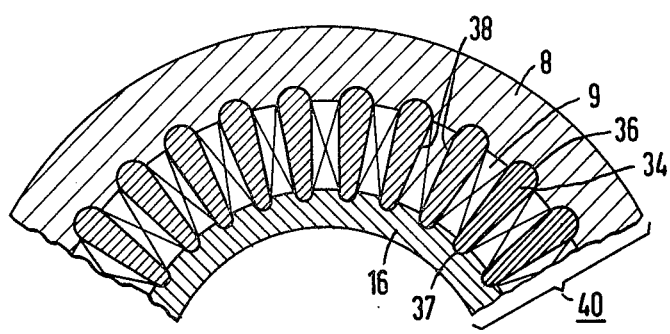
Figure 5C:
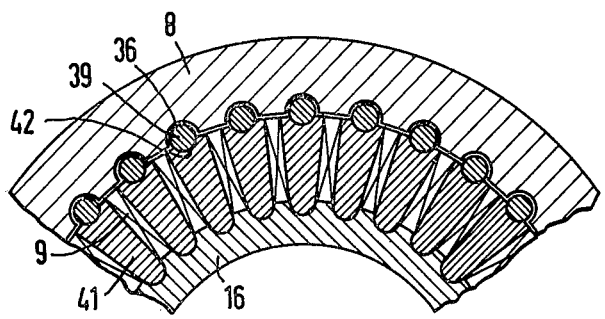

FIGS. 4a and 4b are fragmentary diagrammatic longitudinal sectional views of the device of the invention showing the manner of operation of the radial spring-elastic or resilient suspension system for the exciter winding, respectively at standstill and under operating conditions of the turbogenerator; and FIGS. 5a, 5b and 5c are partial cross-sectional views of three different modifications of the system for securing the superconductive exciter coils in the winding support cylinder of the device of the invention.

Figure 1:
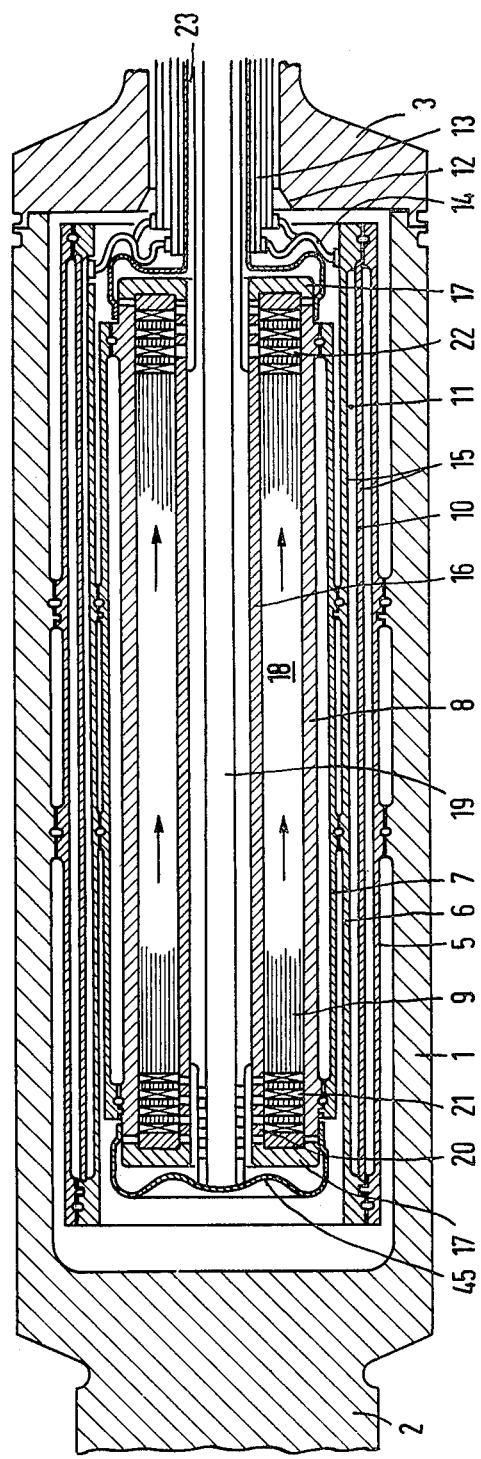
FIG. 1 is a longitudinal sectional view of an active body part of the rotor of a turbogenerator having a superconductive exciter winding and showing one embodiment of a device for securing the exciter winding within the rotor, in accordance with the invention.

Referring now to the drawings and first particularly to FIG. 1 thereof, there is shown therein part of the rotor of a turbogenerator formed of an outer, hollow cylindrical rotor body 1 closed at an end 2 thereof which faces the non-illustrated turbine proper, and vacuum-tightly flanged at the other end 3 thereof to a non-illustrated shaft of an exciter by means of a non-illustrated conventional coupling. The inner space 4 of the rotor body 1 is evacuated. In accordance with the invention, three coaxial, mutually spaced-apart and telescoping intermediate cylinders 5, 6 and 7 are disposed in the inner space 4, a supporting cylinder 8 accommodating a superconductive exciter coil 9 being spring-elastically connected thereby with the outer rotor body 1, as described more fully hereinafter. As shown in FIG. 1, the middle intermediate cylinder 6 is combined with a damper winding which is formed as a cylinder. Cooling channels 11 are provided between the damper cylinder 10 and the middle intermediate cylinder 6 and are traversed by coolant that is transported through concentric or coaxial channels 12 and 13 and through connecting hoses 14. Thus, both cylinders 6 and 10 form a directly-cooled cold shield 15 with which, on the one hand, a predetermined intermediate temperature is maintained and, on the other hand, waste heat generated in the damping cylinder 10 is removed by the coolant.

The superconductive exciter winding or coil 9 is disposed on the inner surface of the supporting cylinder 8, yet another cylinder 16 disposed radially inwardly of and spaced from the supporting cylinder 8 forming an inner limiting surface of a winding or coil chamber 18 defined therebetween. In order that the inner cylinder 16 may be employed simultaneously for absorbing winding or coil forces and as a holder for the winding or coil, both cylinders 8 and 16 are force-lockingly connected one to another at the respective ends thereof by covers 17. The winding or coil chamber 18 thus formed is closed in itself and separated from the vacuum chamber 4. The winding or coil 9 per se, which is formed of exciter coils having a multiplicity of superconductive individual windings, is isolated or insulated in the winding chamber 18 and embedded so as to be resistant to initial short circuits. The mechanical connections of the coils 9 with the supporting cylinder 8 require special measures or features as will be described hereinafter in greater detail.

A flooding or overflow cooling system is selected as the cooling system for the winding or coil 9 of the invention of the instant application. Coolant, namely liquid helium for example, at about 4.5°K supplied through an axial channel 19 from the hollow shaft 3 at the exciter side of the rotor, and is conducted through openings 20 formed in the inner tube or cylinder 16 into the winding head 21 of the winding 9 located at the turbine side of the rotor. The coolant thus floods the winding head 21 and flows through a multiplicity of parallel and axially extending cooling channels of the superconductive exciter winding 9 that are connected to the winding head 21. The coolant is collected at the winding head 22 located at the exciter side of the rotor, and is conducted away through a coaxial annular channel 23 provided in the hollow shaft 3 at the exciter side of the rotor.

Figure 2:
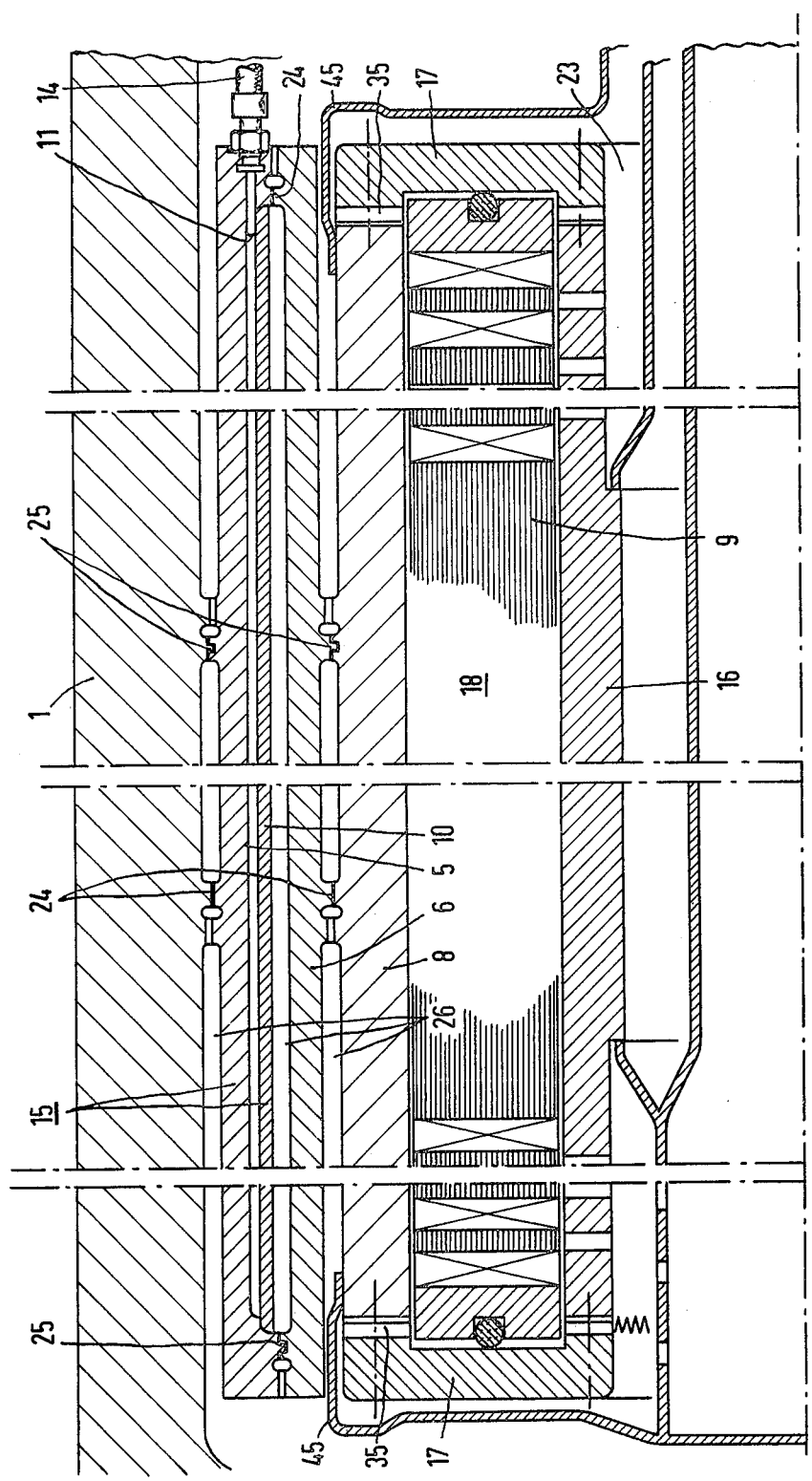
FIG. 2 is an enlarged fragmentary view of FIG. 1 showing a modified second embodiment thereof.

In the modified embodiment of FIG. 2, details of the thermally insulating and spring-elastic or fully floating suspension of the super conductive exciter winding of the invention are visible. In the interest of clarity, only two of the intermediate cylinders 5 and 6 are shown between the rotor body 1 and the winding support cylinder 8 in FIG. 2. The outer intermediate cylinder 5 is combined with the damper cylinder 10 in FIG. 2. As mentioned hereinbefore, the damper cylinder 10 and the outer intermediate cylinder 5 form a cold shield 15, which is supplied with coolant through inner cooling channels 11 and the coolant connectors or hoses 14, and is cooled to about 70° K.

The individual cylinders 1, 5, 6 and 8 are connected one to the other, in accordance with the invention, so that a radially elastic spring system of great softness is produced, and the thermal path leading from the rotor body 1 to the supporting cylinder 8 is as large as possible, all incident forces being nevertheless reliably controlled. The cylinders are respectively connected one to another through narrow articulating points 24 permitting an axial thermal displacement, and axially fixed articulating points 25. The position of the articulating points 24 and 25 is offset axially one from the other from cylinder surface to cylinder surface, these points in the illustrated embodiment of FIG. 2 being located between the rotor body 1 and the outer intermediate cylinder 5 in the middle region of their axial extension, between the intermediate cylinders 5 and 6, respectively, at the outer end of their axial length, and between the middle cylinder 6 and the supporting cylinder 8 again in the middle region. Since the intermediate spaces 26 located between the individual cylinders are evacuated, heat incident from the outside can penetrate into the superconductive winding 9 only through heat conduction in the winding suspension system per se.

Figure 3A:
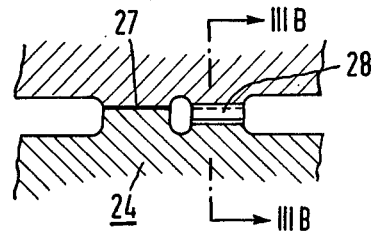
FIG. 3a is a further enlarged fragmentary view of FIG. 2 showing one embodiment of an axially displaceable articulating point between two individual cylinders.
Figure 3B:
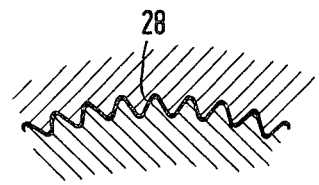
FIG. 3b is a cross-sectional view of FIG. 3a taken along the line III$b$ — III$b$ therein and showing a toothing section diagrammatically.
Figure 3C:
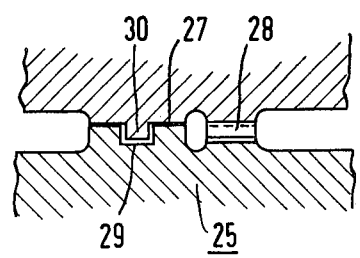
FIG. 3c is a view similar to FIG. 3a of an embodiment of an axially fixed articulating point between two individual cylinders.

The respective connecting points between the individual cylinders are constructed in the manner shown in FIGS. 3a, b and c. The articulating points 24 are formed, according to FIG. 3a, of a very narrow shrink fit 27, a relatively small heat conductive area thereby resulting, and of a narrow revolving toothing or tooth system 28 which transmits torque. In the normal case, such a shrink and toothing connection can permit equalization or balancing of axial expansion as a result of temperature differences, the sliding shrink-fit surfaces 27 being especially treated against freezing, for example by plating, when necessary. For axial stabilization of the system, the other articulation points 25 are formed, in contrast, as fixed points. This can, for example, be effected, as shown in FIG. 3c, by a shaft projection 30 of the one cylinder engaging in a groove 29 formed in the other cylinder.

Heat thus penetrates from the rotor body 1, heated during operation to about 330°K, through the relatively narrow articulating points 24 and 25 into the first intermediate cylinder 5 which is constructed as a cold shield 15. This cold shield 15 guarantees that a temperature of about 70°K prevails at the next inner disposed radial articulating points to the next intermediate cylinder 6. Through the contact surfaces thereof and a relatively long heat conduction path at the inner intermediate cylinder 6, only a slight amount of heat penetrates into the support cylinder 8 per se which is constructed as a winding carrier or support. This described heat or thermal flux refers to a suspension with two intermediate cylinders 5 and 6 as shown in FIG. 2. Through a construction having three or even more intermediate cylinders (FIG. 1), even longer heat conduction paths and an even more efficient thermal shielding of the exciter winding 9 can be attained with the suspension system of the invention.

In FIG. 4a and 4b, the operation of the suspension of the invention is diagrammatically illustrated in different modes or stages thereof. As a result of the relative expansions between the winding carriers 8 and 16 per se, on the one hand, and the rotor body 1, on the other hand, at various conditions of the rotor, such as standstill, normal operation, centrifuging or spinning, and so forth, very different stressing is produced in the intermediate cylinders 5 and 6 (FIG. 2) as well as in the intermediate cylinder 7 (FIG. 1) which act vertually as spring cylinders. Prestressing of the resulting spring system must be effected in such manner that the force lock between the inner winding carrier 16 and the rotor body 1 will not be lost either when the rotor is at a standstill with a low-cooled winding or when the rotor is in operation. Consequently, a specific optimal layout of the spring system is necessary, through suitable dimensioning of the shrink fits 27 which are adjusted to the operating conditions so that the lowest stressing is produced in the intermediate cylinders during operation.

Since the support cylinder 8 expands at its greatest for an uncooled winding as compared to the low-cooled operating condition thereof, deformation of the intermediate cylinders as shown in FIG. 4a results therefrom. This thermal expansion of the support cylinder 8, is thus absorbed by the intermediate cylinders 5 and 6, which accordingly deform as shown in FIG. 4a. If the support cylinder 8 during operating condition, as shown in FIG. 4b, is then cooled again to 4.5°K. and thereby contracts, the intermediate cylinders 5 and 6 resume their normal position so that, during operation, thereby these intermediate cylinders are exposed to the lowest stressing.

The superconductive exciter windings per se require an especially careful and painstaking mounting in the support cylinder 8 because, due to the high use of electricity, large radial and tangential forces occur during operation and in short circuit, which have a disadvantageous effect on superconductors, which are more sensitive as compared to normal conductors. In addition, there is the difficult assembly within the cylinder 8 in comparison to conventional turborotors, and the fact that superconductive coils should have only a minimum of conductor soldering points. Under these complicating conditions, a mechanical yet electrically insulating connection of the coils with the support cylinders is required which is able to maintain the coils in the position thereof without fault, and to transmit the high tangential forces to the support cylinder, which is formed of high tensile, low-temperature resistant steel.

In FIG. 5a, there is shown one manner of securing the superconductive winding 9. Longitudinal grooves 31 are machined in the inner surface of the support cylinder 8, bars 32 of plastic material, that are highly durable and that are yet adequately elastic at low temperatures, being inserted therein and having a radially inwardly disposed longitudinal edge engaging in corresponding longitudinal grooves 33 formed in the inner cylinder 16. Between the bars 32 of plastic material, the individual coils 9 of the superconductive winding are then inserted, the tangential forces corresponding to the resulting torques being reliably overcome. The bars 32 of plastic material are expediently provided with a fiber reinforcement.

In FIG. 5b, the manner of securing the superconductive winding or coil 9 is illustrated as being effected by metallic connecting elements 34. Moreover, as can also be seen from FIGS. 1 and 2, the ends of the support cylinder 8 are connected with the ends of the inner cylinder 16, which may be formed of steel by means of thickly dimensioned covers 17 so that the inner cylinder 16 also can absorb torques and can transmit them through the covers 17 to the cover cylinder 8. Such a functioning force-locking connection is attained with the aid of an end-face toothing system 35 similar to that of a spur gear. Through the disposition of wedge-shaped bars 34 according to FIG. 5b, which are uniformly distributed about the periphery of the support cylinder 8 and the inner cylinder 16 and engage in longitudinal grooves 36 formed in the support cylinder 8 and in longitudinal grooves 37 formed in the inner cylinder 16, parallel flanking winding grooves 38 are produced, in which the superconductive coils 9 are received. With this construction according to the invention, very high tangential forces can be transmitted through the force-locking connection of the inner cylinder 16 and the support cylinder 8. The inner cylinder 16 serves moreover as base for the coil assembly or construction. The entire winding carrier 40 formed of the support cylinder 8, the bars 34, the inner cylinder 16 and the covers 17 consequently permits the installation of complete, undivided coils 9. The insulated coils 9 are thereby initially fitted or accommodated to the inner cylinder 16 and retained by conventional auxiliary devices not shown in the drawing. Then, the bars 34 are inserted in radial direction and, finally the winding or coil 9 completely assembled at the inner cylinder 16 is driven into the support cylinder 8.

According to FIG. 5c, steel rods 39 of circular cross section can also be disposed in longitudinal grooves 36 for transmitting the torque to the support cylinder 8. In this case, the winding 9 completely assembled at the inner cylinder 16 and cast in resin and hardened or aged in common with the rods 41 permits stripping thereof to an accurate degree of fit. In connection therewith, the milling of the semicircular longitudinal grooves 42 in the bars 41 can be effected on a milling machine with very great accuracy in graduations. After this completely assembled winding has been inserted with the intermediate bars into the support cylinder 8, the steel rods 39 of circular cross section are then able to be slid in. Through this construction, the over-all high demands on manufacturing technology are markedly reduced.

Through the aforedescribed construction or assembly of the rotor and the corresponding securing system for the superconductive exciter winding at the support cylinder proper and, as well, the radial, spring-elastic connection of the support cylinder with the outer rotor body, there is accordingly produced a securing system which largely stops thermal irradiation and thermal introduction from the outside, but which, however, is adequately elastic to equalize or balance reliably all expansions and stresses that are produced due to the different levels of temperature, and with which, furthermore, all stresses, even in the event of short-circuit, can be transmitted reliably.

We claim:

1. Device for securing a superconductive exciter winding in a thermally insulating, thermally elastic and short-circuit proof manner within the rotor of a turbogenerator wherein the rotor has a body part thereof formed as a hollow cylinder, comprising a plurality of telescoping intermediate cylinders disposable within the hollow cylinder spaced from and coaxial to one another and to the hollow cylinder, said intermediate cylinders forming cold shields and vibration damping means, the hollow cylinder being closed at both ends thereof, a support cylinder located within and spaced from the innermost of said telescoping intermediate cylinders and adapted to support a superconductive exciter winding on the inner side thereof, said intermediate cylinders as well as said support cylinder are force-lockingly connected one to another with minimal contact areas through pairwise axially transposed articulating points to permit resiliency in radial direction and freedom to expand in axial direction, the spaces between said cylinders being evacuated so as to insulate said cylinders thermally one from the other, and a plurality of cooling circuit means for maintaining said cylinders individually at varying temperature levels.

2. Device according to claim 1 wherein each of said articulating points is formed of a narrow encircling shrink fit and an adjacent peripherally extending toothing.

3. Device according to claim 1 wherein opposing articulating points of the respective pairs thereof transposed in axial direction are formed of an axially displaceable and an axially fixed securing device.

4. Device according to claim 3 wherein, in vicinity of said shrink fit, a peripheral projection is formed in the surface of one cylinder and engages in a peripheral groove formed in the surface of a respective adjacent cylinder.

5. Device according to claim 3 wherein said shrink fits of said articulating points are of predetermined dimension so that stressing of said intermediate cylinders is minimal during operation of the generator of the turbogenerator.

6. Device according to claim 1 including an inner cylinder disposed coaxially within and spaced from said support cylinder, a winding chamber located radially outwardly of said inner cylinder and radially inwardly of said support cylinder, and a pair of covers connecting said inner cylinder and said support cylinder at the respective ends thereof and closing said winding chamber and including toothing means for force-lockingly connecting said support cylinder to said inner cylinder through said covers.

7. Device according to claim 6 including a plurality of radially extending bars received in corresponding longitudinal grooves formed in said support cylinder and said inner cylinder within said winding chamber, said bars being fixed by the exciter winding.

8. Device according to claim 7 wherein said bars are formed of a low temperature-proof, fiber-reinforced plastic material.

9. Device according to claim 7 wherein said bars are formed of metal selected from the group consisting of high-tensile steel and light metal.

10. Device according to claim 9 comprising axially extending steel keys engaging in said longitudinal grooves formed in said support cylinder and in grooves formed in the radially outer ends of said bars, for transmitting torque to said support cylinder.

11. Device according to claim 1 including an inner cylinder disposed coaxially within and spaced from said support cylinder, a winding chamber located radially outwardly of said inner cylinder and radially inwardly of said support cylinder, a pair of first covers connecting said inner cylinder and said support cylinder at the respective ends thereof and closing said winding chamber, and a pair of elastically expansible second covers helium-tightly closing said winding chamber, defined by said support cylinder, said inner cylinder and said first covers, at both ends of said winding chamber.

12. Device according to claim 11 including a supply tube axially disposed in said inner cylinder, and said inner cylinder being formed with openings, low-cooled coolant being introducible through said supply tube and said openings into the head of the exciter winding facing toward the turbine of the turbogenerator.

13. Device according to claim 1 wherein one of said intermediate cylinders is structurally combined with a damping cylinder located coaxially adjacent thereto and spaced therefrom, and including coolant channels axially extending in the space therebetween and forming the combined structure into a cold shield, contact surfaces between said one intermediate cylinder and said damping cylinder being force-lockingly connected one to another by foil solder.

* * * * *